July 3, 1962 D. W. HEINIGER 3,042,434
PORTABLE, MAN-CARRIED, POWER-DRIVEN TOOL
Filed July 15, 1959 3 Sheets-Sheet 1

Inventor
Daniel W. Heiniger
By Nathan H. Kraus
Frank H. Marlss
Attys.

July 3, 1962  D. W. HEINIGER  3,042,434
PORTABLE, MAN-CARRIED, POWER-DRIVEN TOOL
Filed July 15, 1959  3 Sheets-Sheet 2
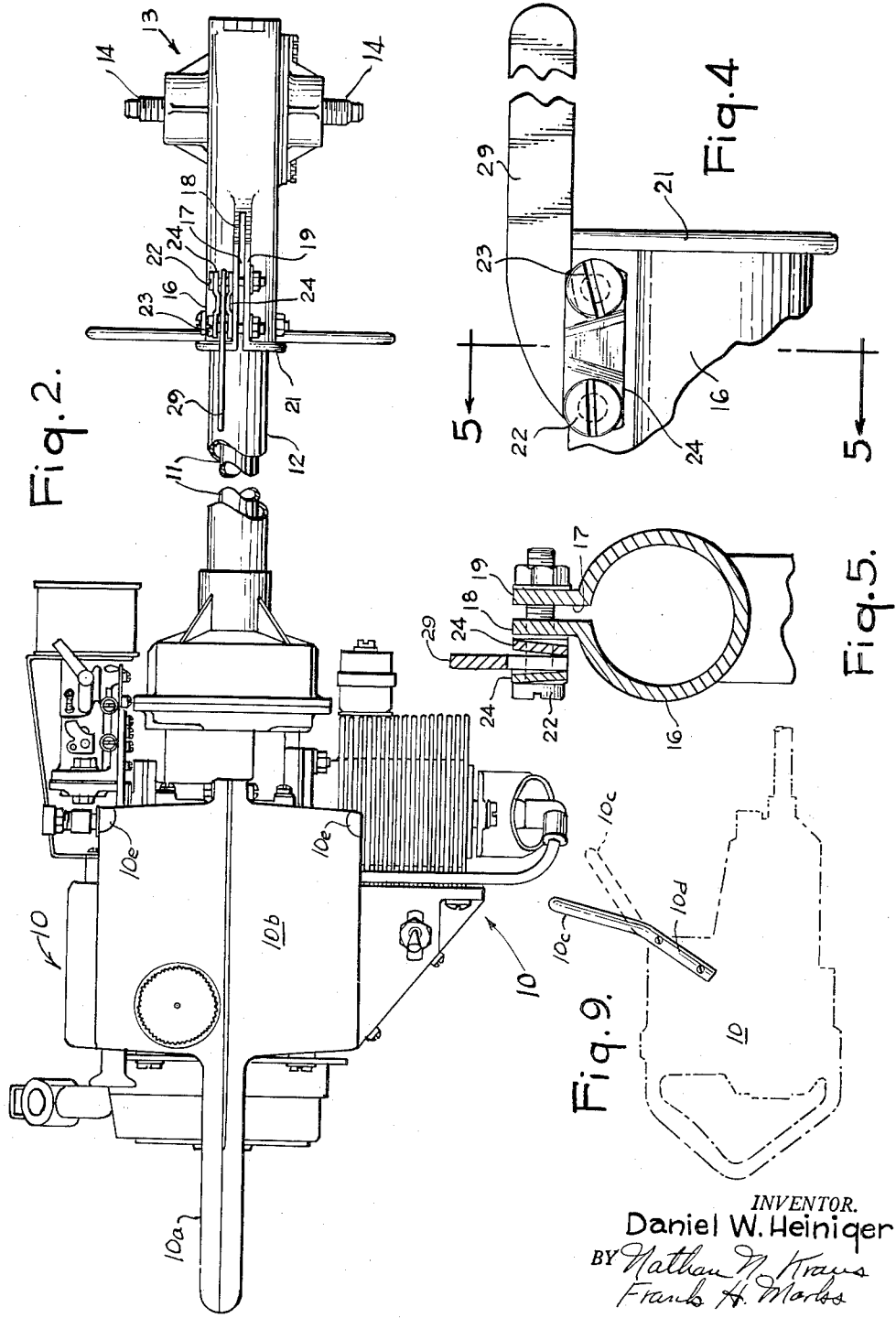
INVENTOR.
Daniel W. Heiniger
BY Nathan N. Krause
Frank H. Morse
Attorneys July 3, 1962 D. W. HEINIGER 3,042,434
PORTABLE, MAN-CARRIED, POWER-DRIVEN TOOL
Filed July 15, 1959 3 Sheets-Sheet 3
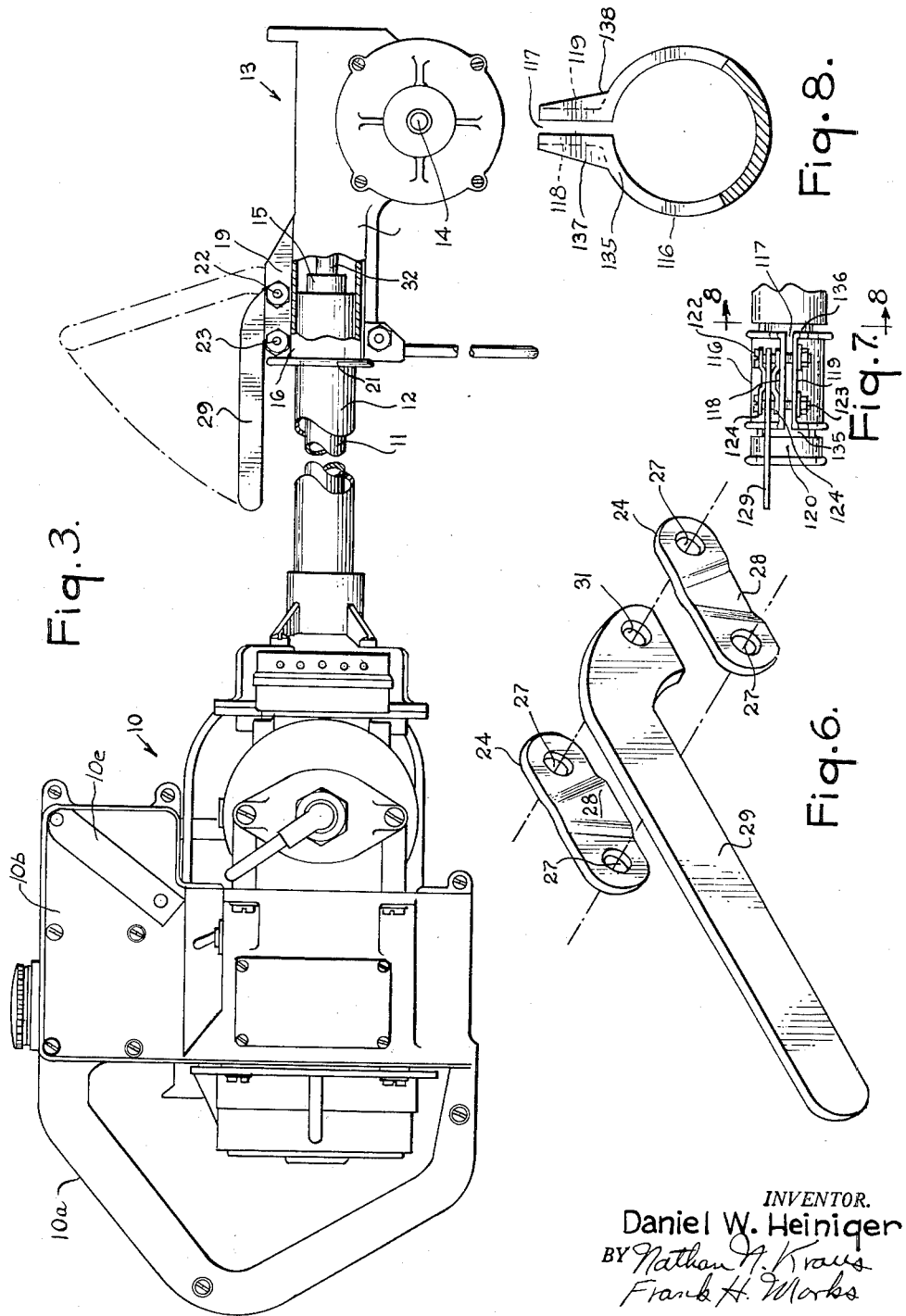
INVENTOR.
Daniel W. Heiniger
BY Nathan A. Kraus
Frank H. Marks
Attorneys

United States Patent Office 3,042,434
Patented July 3, 1962

3,042,434
PORTABLE, MAN-CARRIED, POWER-DRIVEN TOOL
Daniel W. Heiniger, Kankakee, Ill., assignor to Sears, Roebuck and Co., Chicago, Ill., a corporation of New York
Filed July 15, 1959, Ser. No. 827,239
3 Claims. (Cl. 287—58)

My invention relates to portable, man-carried, power-driven tools and implements.

One of the objects of my invention is the provision of a portable, man-carried apparatus having a power unit and means for interchangeably attaching a tool or implement thereto, at an appropriate distance from the operator, so as to facilitate the performance of a variety of work operations with a minimum of fatigue to the operator.

Another object of my invention is the provision of an apparatus of the foregoing character, affording convenient handholds for the operator whereby the apparatus is maintained in desired balance during its operation so that it may be easily carried and manipulated with ease and without danger of injury to the operator.

A further object of my invention is a provision in an apparatus of the foregoing character of means for rapidly and efficiently coupling and uncoupling interchangeable implements or attachments to and from the power unit.

Still a further object of my invention is the provision of an apparatus of the foregoing character intended for use for different purposes, such as cutting grass, trimming and edging lawns, and tilling and cultivating soil, and the like.

Other and further objects and advantages of my invention will become apparent from the following description when considered in connection with the accompanying drawings in which:

FIG. 2 is a plan view thereof, with the forward handle removed;

FIG. 3 is a side elevational view of the apparatus illustrated in FIG. 1, with certain parts broken away to show details of construction, and with the handle removed;

FIG. 4 is a fragmentary elevational view, on an enlarged scale, illustrating certain structural details embodied in my invention;

FIG. 5 is a cross-sectional view taken on line 5—5 of FIG. 4;

FIG. 6 is an exploded perpective view illustrating certain details embodied in my invention;

FIG. 7 is a fragmentary top plan view of a modified clamping arrangement;

FIG. 8 is a cross-sectional view on an enlarged scale taken substantially along lines 8—8 of FIG. 7, and illustrating only the outer tubular section; and FIG. 9 is a more or less diagrammatic view showing the two positions for monting the forward handle.

Figure 1:
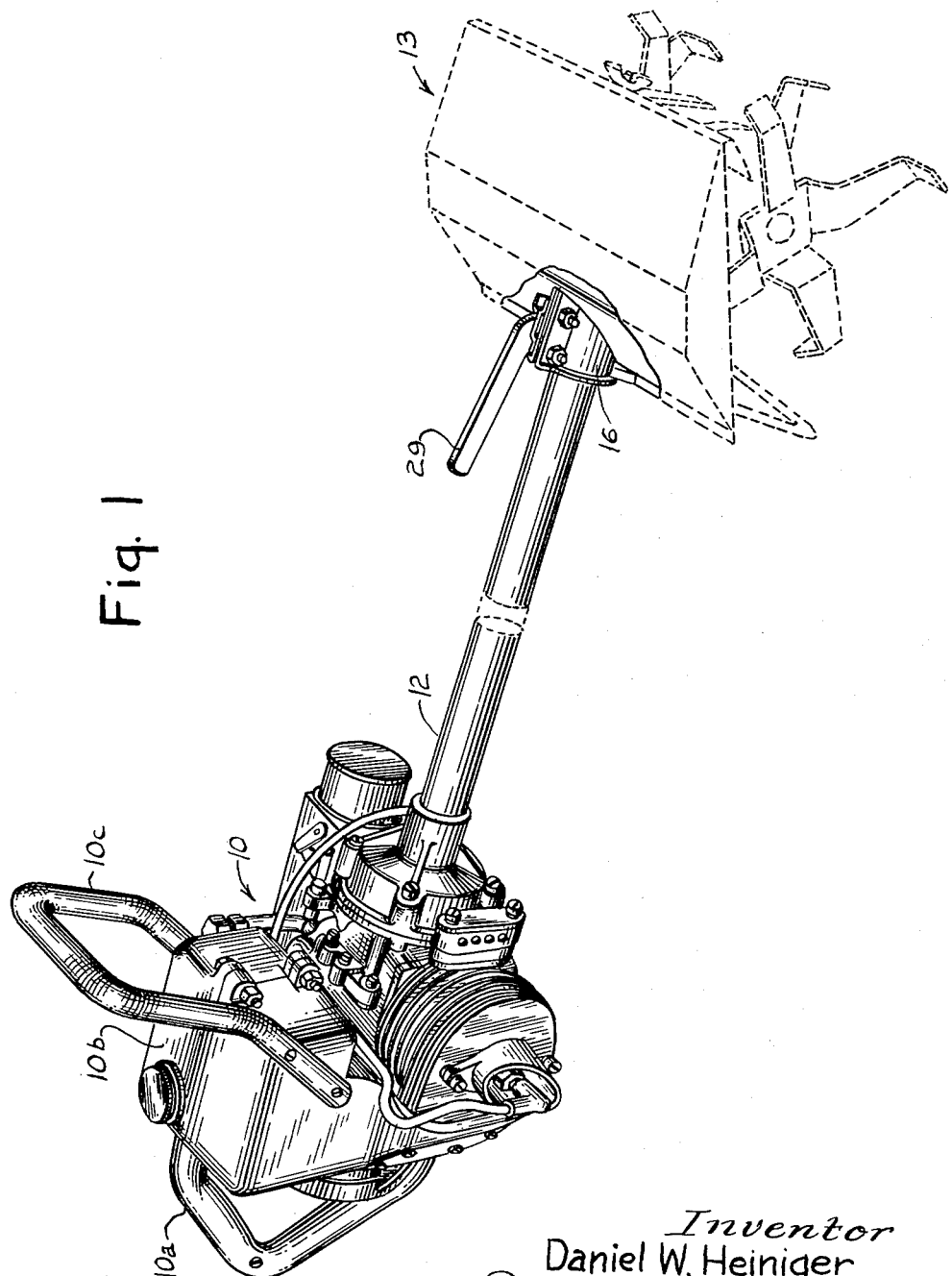
FIGURE 1 is a perspective view of an apparatus in accordance with a preferred embodiment of my invention.

Referring to the drawings, my invention comprises a portable gasoline engine power unit indicated generally by the numeral 10, the said power unit having an elongated tubular drive shaft 11 operatively connected at one end with the engine of the power unit through a centrifugal clutch, and having a splined socket 15 at the other end. Drive shaft 11 is housed in a tubular sleeve 12 which extends from the body of the engine.

Power unit 10 is provided with a rearwardly extending handle 10a which is integral with the casting constituting the fuel tank 10b of the power unit. A forward handle 10c comprising a tubular member bent in the form of an inverted U, with the lower portions 10d of the legs angled rearwardly, is bolted to the upper sides of the casting 10b in grooves 10e provided therein. The bight portion of the handle 10c extends over and transversely of the power unit, substantially at the center of gravity of the power unit at a desired point of balance. The handle 10c may be mounted in the manner illustrated by the broken lines in FIG. 9 for the convenience of an operator who may be of short stature, the solid-line position being preferred for operators of tall stature.

The power unit just described is intended to be employed with a plurality of interchangeable attachments or tools of which may be garden implements or other tool devices adapted to be power driven. In FIGS. 1, 2 and 3, there is illustrated one of such attachments, the same being identified by the numeral 13 and in the present instance constituting a cultivating apparatus having a driven shaft 14 extending at a right angle to the drive shaft 11 and being adapted to receive on each end thereof a suitable blade or tine element, not shown.

The attachment 13 is provided with a relatively short tubular neck portion 16 which is slotted inwardly from the end for a short distance as at 17. Flanges 18 and 19 integral with the tubular neck portion 16, extend upwardly from opposite marginal edges of the slot 17. The flanges 18 and 19, thus, are spaced from each other and are in substantially parallel relation. The end of the tubular neck portion 16 is provided with a bead 21 which extends to the tops of each of the flanges 18 and 19. Each of the said flanges is provided with a pair of spaced apertures, with corresponding apertures being in transverse registration for receiving bolts 22 and 23. Adjacent the flange 18, I dispose camming means for effecting a constraction of the tubular neck portion 16, for a purpose as hereinafter will be explained. The camming means comprises a pair of identical opposed camming plates 24 (FIG. 6), each having a pair of spaced apertures 27 for receiving the bolts 22 and 23. As will be seen more clearly in FIG. 6, each plate 24 which is formed, preferably of hardened steel, is provided with an intermediate embossed portion affording a plane surface 28 inclined away from the vertical in a downward direction. Said plain surfaces are in opposed spaced relation. An actuating lever 29, shaped substantially as illustrated in FIG. 6, is provided with an aperture 31 to receive the bolt 22 and is arranged to be pivotally movable about the axis of said bolt between the camming plates 24, the range of movement being between the solid and broken line positions illustrated in FIG. 3. It will be understood that the structure just described forms a part of the structure of every attachment intended for use with the power unit.

A shaft 32 provided with a splined head is arranged within the tubular neck portion 16, substantially axially thereof, and is operatively connected by means of suitable gearing to shaft 14. The splined head is arranged to be received in the socket 15 of the shaft 11 when an attachment is connected to the power unit. When so connected, the end of the sleeve 12 is telescopically received in the tubular neck portion 16 of the attachment, as illustrated in FIGS. 2 and 3.

In order to couple the attachment 13 to the power unit 10, the lever 29 is moved to the broken line position illustrated in FIG. 3. In such position no stress is applied to any part of the neck portion 16 so that the circular opening thereof is at a maximum, and the end of the sleeve 12 may be easily inserted therein in telescoping relation, as illustrated in FIG. 3. The lever 29 is then moved to the solid line position illustrated in FIG. 3. In such movement the lever 29 engages the opposite inclined plane surfaces 28 of the camming plates 24 tending to push them farther apart. This action effects an application of stress on each of the flanges 18 and 19, from the outside inwardly, tending to draw said flanges closer together and effecting a contraction of the neck portion 16 about the end of the sleeve 12 thereby securely clamping said neck portion on said sleeve.

In order to detach the implement or the attachment 13 from the power unit 10, the lever 29 is swung to the broken line position illustrated in FIG. 3, to relieve the stresses on the flanges 18 and 19, permitting the same to return to normal unstressed condition wherein the opening of the neck portion 16 is at a maximum, affording clearance for withdrawing the end of the sleeve 12 from the neck portion.

It will be understood that each attachment intended for use with the hereinabove described power unit will include a shaft provided with a splined head similar to shaft 32.

In the modified embodiment illustrated in FIGS. 7 and 8 the tubular neck portion 116 is provided with spaced integral flanges 118 and 119 similar to the flanges 18 and 19, of the preferred embodiment. In this instance, however, the flanges 118 and 119 are spaced from the end a short distance leaving the end portion 120 fully annular in cross section. The neck portion 116 is slotted longitudinal as at 117 between the flanges 118 and 119 with the slot 117 extending between and connecting with transverse slots 135 and 136. As will be seen in FIG. 8, each of the transverse slots extends circumferentially over an arc of approximately 240° providing in effect with the flanges 118 and 119, a pair of opposed cantilever portions 137 and 138.

Similarly, as in the first described embodiment, the flanges 118 and 119 are provided with apertures receiving bolts 122 and 123 which secure the camming plates 124 and actuating lever 129.

The modified embodiment just described, functions in a manner identical to that of the preferred embodiment.

It will be apparent from the foregoing that I have provided improved means for rapidly and easily effecting coupling and uncoupling of tubular sections.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. In combination, a pair of separable, substantially tubular sections arranged to be received one within the other in telescoping relation, the outer of said sections having a slot extending longitudinally thereof, an outwardly extending flange integral with each marginal edge portion of said outer section on opposite sides of said slot and with said flanges being substantially in parallel relation, a pair of camming elements arranged adjacent only one of said flanges, said flanges and camming elements each having an aperture with all of said apertures being in registration, a bolt passing through said apertures, a lever pivotally mounted on said bolt intermediate said camming elements, said lever when moved into engagement with said camming elements effecting a contraction of the outer tubular section about the inner section whereby to securely clamp said sections together.

2. In combination, a pair of separable tubular sections, one being an inner section and the other being an outer section with the inner section being arranged to be received in said outer section, said outer section having on its periphery a pair of spaced flanges extending outwardly and longitudinally thereof, the wall of said outer section being slotted between said flanges, a pair of separate plates arranged in opposed relation and disposed adjacent only one of said flanges, at least one of said plates having an inclined plane surface, a lever arranged to cooperate with said plane surface, said plates, lever and flanges each having an aperture with all of said apertures being in registration, a bolt passing loosely through said apertures, said lever when moved into engagement with said plane surface effecting a contraction of the outer section about said inner section whereby to securely clamp said sections together.

3. In combination, a pair of separable tubular sections, one being an inner section and the other being an outer section with the inner section being arranged to be received in said outer section, said outer section having on its periphery a pair of spaced flanges extending outwardly and longitudinally therefrom, the wall of said outer section being slotted longitudinally between said flanges and being slotted transversely adjacent the ends of said flanges, a pair of separate plates arranged in opposed relationship and disposed adjacent to only one of said flanges, at least one of said plates having an inclined plane surface, a lever arranged to cooperate with said plane surface, said plates, lever and flange each having an aperture with all of said apertures being in registration, a bolt passing loosely through said apertures, a lever pivotally mounted on said bolt intermediate said plates, said lever when moved into engagement with said inclined surface effecting a contraction of the outer tubular section about the inner section whereby to securely clamp said sections together.

References Cited in the file of this patent

UNITED STATES PATENTS

| | | |
|---|---|---|
| 949,066 | Fowler | Feb. 15, 1910 |
| 1,218,695 | Phillips | Mar. 13, 1917 |
| 1,844,113 | Beidler et al. | Feb. 9, 1932 |
| 2,304,343 | Diesbach | Dec. 8, 1942 |
| 2,341,424 | Chason | Feb. 8, 1944 |
| 2,550,590 | Parmilleux | Apr. 24, 1951 |
| 2,638,302 | Reed | May 12, 1953 |
| 2,675,835 | Kiekhaefer | Apr. 20, 1954 |
| 2,734,760 | Marquis et al. | Feb. 14, 1956 |
| 2,750,141 | Tobias | June 12, 1956 |
| 2,810,409 | Ibelle et al. | Oct. 22, 1957 |
| 2,843,164 | Marsh | July 15, 1958 |
| 2,888,994 | Hoff et al. | June 2, 1959 |